United States Patent [19]

Siegert

[11] Patent Number: 6,012,251

[45] Date of Patent: *Jan. 11, 2000

[54] POURABLE VEGETATION SOIL SUBSTRATE PROCESS FOR THE PRODUCTION THEREOF AND THE USE THEREOF

[75] Inventor: Paul Siegert, Pinneberg, Germany

[73] Assignee: Aktual Bauteile und Umweltschutz Systeme, GmbH, Tornesch, Germany

[*] Notice: Under 35 U.S.C. 154(b), the term of this patent shall be extended for 179 days.

[21] Appl. No.: 08/521,356

[22] Filed: Aug. 30, 1995

[30] Foreign Application Priority Data

Sep. 7, 1994 [EP] European Pat. Off. .............. 94114142

[51] Int. Cl.[7] ................................ A01G 9/10; C05F 11/00
[52] U.S. Cl. ...................................... 47/59; 47/64
[58] Field of Search .................... 47/59 CO, 64, 47/58

[56] References Cited

FOREIGN PATENT DOCUMENTS

| 0355250 | 2/1990 | European Pat. Off. ............ 47/59 CO |
| 0004703 | 1/1979 | Japan ................. 47/59 CO |
| 3003732 | 1/1988 | Japan ................. 47/59 CO |
| 1312933 | 12/1989 | Japan ................. 47/59 CO |
| 7117024 | 6/1972 | Netherlands ........................ 47/59 CO |
| 2 274 997 | 8/1994 | United Kingdom . |

*Primary Examiner*—Michael J. Carone
*Assistant Examiner*—Joanne Downs
*Attorney, Agent, or Firm*—Roberts & Mercanti, L.L.P.

[57] ABSTRACT

A fiber reinforced, pourable, soil substrate for supporting vegetation, comprising substantially undecayable, loose, individual, untwisted or carded plastic fibers in the form of filaments having lengths of from about 1 cm to about 10 cm; a slowly decomposable, difficultly decayable, organic, fibers and the balance easily decayable organic constituents and aggregates. The substrate has a thickness of from about 0.5 cm to about 30 cm.

20 Claims, No Drawings

POURABLE VEGETATION SOIL SUBSTRATE PROCESS FOR THE PRODUCTION THEREOF AND THE USE THEREOF

BACKGROUND OF THE INVENTION

1. Field of the Invention

The invention relates to fiber-reinforced, pourable, vegetation soil substrates. Such are useful as vegetation supports for surfaces such as roofs and the like.

2. Description of the Prior Art

Vegetation soil substrates are known in the art, as exemplified by GB-A-2 274 997. Such substrates are particular useful for sports grounds having grass surfaces and which are greatly stressed by sportsmen. The organic substrate constituents in this prior disclosure are exclusively formed by peat and top soil. For stabilizing roots, synthetic single plastic fibers in quantities of 0.9 to 0.4 wt. % are proposed. FR-A-2 442 809 relates to a fiber substrate for improving plant growth and which can comprise natural and synthetic substances. The substrate can be in mixed form and can be produced both from new and recycled materials having a fiber length of 1 to 2 cm, such as cardboard, hardboard and textiles.

Numerous different types of pourable vegetation soil substrates exist and can be adapted to the particular desired greening use. In certain layer thicknesses of 0.5 to 30 cm they form an artificial soil structure, namely a vegetation support layer, for absorbing or receiving the actual vegetation and optionally precipitation and irrigation water. Vegetation soil substrates are also known in the art from DE-B-24 59 269 and DE-C-832 897.

The art also discloses vegetation mats, e.g. from EP-B-608 450 and the references cited therein, which offers a survey of further prior publications and literature. Each of these disclosures is incorporated herein by references.

During periods of drought, ground water is consumed both by plants via their roots for growth purposes, and also by evaporation, as via the leaves. Independent of the layer thickness of such an artificial soil structure, within a few days or a number of weeks, notch or dryness cracks appear on the soil surface. They are in general only a few millimeters wide but they can also be several centimeters wide.

In normal agriculture and horticulture, such cracks are not advantageous for the plants and cultivation. However, they close again by the swelling which occurs in conjunction with the absorption of water when rain falls or as a result of artificial irrigation or sprinkling. In such cases, such cracks are destroyed or rendered ineffective by following cultivation or other care measures such as hoeing.

However, cracks they have a serious effect on vegetation surfaces which no longer have any connection with supporting soil such as with vegetation mats used to green indoor areas. It is particularly serious if such surfaces are sloping roof surfaces. Thus, due to generally thin layers, dry cracks occur with much smaller intervals than in soil. Due to the limited layer thickness, wind, sun and dryness with their drying, consuming action rapidly reach fine fibrous root systems.

Particularly in the case of extensive greened roof surfaces, the vegetation is of a relatively low and very loose type, which even grows in the gaps. Therefore, the sun, wind, rain, snow and ice have almost unhindered, direct access to such cracks in the substrate, particularly in the substrate surface. In the case of roof greening, starting from such substrate cracks and in particular at the cut edges, such as directly behind an attic in the case of flat roofs, at corners, and more particularly at ridge and verges, the wind gives rise to extensive erosion effects, which extensively act on vegetation having only a weak root structure.

Such substrates and soils are generally hydrophobic, i.e., if they have dried out, they absorb water only very slowly. This restricts water absorption up to complete swelling, because such cracks are closed again by swelling and last much longer when rain water starts to flow. This leads to very serious water erosion. Frequently roof greening areas of several square meters are eroded as a result of this effect. If in such cases an incorrectly stabilized substrate is used, complete roof surfaces are eroded and slip.

Above and beyond such soil or substrate physical circumstances, particularly in the case of roof greening or when greening surfaces without a soil connection, the problem is to provide such substrates with suitable organic substances. The organic substance normally present in the soil evolves over a period of years or decades through the growth of roots and leaves and the general transformation thereof over a period of years into humus and nutrient humus. Finally such substances are mineralized and are then available to plant roots as absorbable nutrients.

In the case of substrates for surfaces without a soil connection, organic substances only very slowly decay, unlike in the case of plant or root mass. In this way the necessary macropore volume is obtained, so that the plant roots in such greened areas can be supplied with oxygen by means of the corresponding air pore volume. Unlike in agriculture or horticulture, it is not possible in such cases to plough or dig one or more times a year or to hoe for soil ventilation purposes. A too rapid transformation of the organic substance greatly increases the proportion of fines in such substrates, which leads to a rapid loss of the necessary pore volume due to the sealing or clogging of the pores and layers, so that root breathing is limited and is gradually prevented.

The invention seeks to so improve on the aforementioned fiber reinforced pourable vegetation supporting soil substrates, so that it reliably avoids the described disadvantages, i.e. it does not allow dryness cracks as well as wind and/or soil erosion to appear. In addition, the sealing or clogging of the substrate surface due to precipitation or irrigation is to be prevented. It is also naturally advantageous to encourage ecologically advantageous substance cycles. These problems are solved by the vegetation soil substrate and process according to the invention.

SUMMARY OF THE INVENTION

The invention provides a fiber reinforced, pourable, soil substrate for supporting vegetation, comprising from about 3.75 to about 30 vol. % of substantially undecayable, loose, individual, untwisted or carded plastic fibers in the form of filaments having lengths of from about 1 cm to about 10 cm; from about 0.5 to about 25 vol. % of slowly decomposable, difficultly decayable, organic, fibers; and the balance being one or more of easily decayable organic constituents and aggregates. The substrate has a preferred thickness of from about 0.5 cm to about 30 cm.

The invention also provides a process for the production of a pourable vegetation soil substrate comprising providing string, twisted rope or fiber woven fabrics comprising plastic fibers; cutting the plastic fibers into 1 to 10 cm lengths; untwisting and/or carding the fibers to individual filaments; and then homogeneously mixing from about 3.50 to about 30 vol. % of the filaments with from about 0.5 to about 25 vol. % of slowly decomposable, difficultly decayable organic fibers.

The invention further provides a process for vegetating a surface comprising preparing a pourable vegetation soil substrate by providing string, twisted rope or fiber woven fabrics comprising plastic fibers, cutting the plastic fibers into 1 to 10 cm lengths; and untwisting and/or carding the fibers to individual filaments. One then homogeneously mixes from about 3.50 to about 30 vol. % of the filaments with from about 0.5 to about 25 vol. % of slowly decomposable, difficultly decayable organic fibers; shapes the substrate into the form of a substantially flat, vegetation support layer having a thickness of from about 0.5 cm to about 30 cm, and positions the layer on a surface such as a roof.

DETAILED DESCRIPTION OF THE PREFERRED EMBODIMENT

The invention provides forming a mixture comprising, substantially non-decayable, plastic, reinforcing, fibrous constituents, and difficultly decayable, organic, fibrous constituents. The mixture forms a dry, crack preventing substance by acting as an interlacing "fibrous reinforcement" similar to structural steel fabric mats in concrete or fabric reinforcements e.g. in roof sealing webs. For the purpose of this invention, difficultly decayable, organic fibrous constituents are defined as natural materials which start to decay only after several months and may last for years. Preferably such materials are not substantially microbiologically decayed after one year.

Non-exclusive examples of slowly decomposing, difficultly decayable, organic constituents include coconut, sisal fibers, jute fibers, ricinus pieces, rice pieces and cacao shells. The difficultly decayable fibrous components, until they have decayed after a period of several months have the same function until the root felt of the vegetation partly takes over this function and also until the established vegetation by the shading action counteracts drying out and other erosion risks of the substrate. The slowly decomposable organic fibers also form a very slow flowing humus source, which ideally optimizes the water storage and adsorption capacity, the structure and pore volume of the roof greening substrates. Different requirements call for differentiated mixtures and certain of these are exemplified hereinafter. The organic, slowing decomposable fibers, which can differ as a function of availability, can be admixed in a volume proportion of from about 0.5 to about 25 vol. %.

As a function of the structure or use of such substrates in roof greening, different fibrous mixtures and proportions are required, depending on whether its use is on a flat or a sloping roof. The mixture formed also depends on whether only horizontal crack formation is to be prevented or whether horizontal-vertical interlacing of the fibrous reinforcement is necessary for the substrate surface when water and wind erosion or harmful clogging are to be prevented. This is particularly advantageously brought about by the shorter and thicker reinforcing fiber portions, which as a result of their characteristics tend to stand upright and therefore interlace, in palisade-like manner, with the longer reinforcing fibers, while being located in the substrate layer and projecting over the substrate surface, so as to counteract water and wind erosion, as well as clogging.

The inventive substrate for supporting vegetation comprises from about 3.50 to about 30 vol. % of the substantially undecayable, loose, individual, untwisted or carded plastic fibers in the form of filaments having lengths of from about 1 cm to about 10 cm. Suitable undecayable, highly differentiable, reinforcing plastic fibers non-exclusively include polyamide, polyester and polyolefins such as polyethylene and polypropylene. Suitable fiber distributions are listed in Table 1. The percentages given in Table 1 are volume percentages based on the substrate quantity to be produced from the reinforcing fiber groups A, B and C. Table 2 shows the total quantity of synthetic reinforcing fibers of the individual exemplified mixtures, although the invention is not restricted thereto. Other formulations with respect to the mixtures, their weight proportions and the dtex values are within the scope of the invention. It is also possible to only use synthetic fibers having the same length/dtex. Preferably the plastic fibers are of from about 5 to about 300 dtex. Dtex is defined as the weight in grams per 10,000 meters of fiber. As a result of their chemical and physical characteristics both the organic and synthetic fibers are subject to a so-called mixed volume loss during the substrate production process. Thus, if the reinforcing fibers or organic components are mixed with other aggregates, such as mineral stabilizers from crushed expanded clay, expanded shale and rock chips, clay and other heavy materials, they are compressed and enter the cavities between the broken edges of the stabilizer grains necessary for the meshing together.

It is also known that a corresponding substrate, e.g. produced with 30 vol. % peat, as a function of the characteristics of the other aggregates in the analysis of the finished substrate possibly only has 4 to 8 wt. % organic substance. Much the same would occur with synthetic reinforcing fibers.

Preferably the substrate additionally comprises an easily degradable organic component. For the purpose of this invention, easily decayable organic components are defined as natural materials which start to decay promptly and microbiologically decay substantially totally in less than about two years, usually less than one year or about one vegetation period. Such include peat, composted manure, and decayed plant and are preferably present in an amount of from about 5 volume % to about 15 volume %.

Preferably the substrate additionally comprises aggregates in an amount of from about 10 volume % to about 90 volume %, preferably from about 50 volume % to about 75 volume %. The "miscellaneous substrate fractions" in Table 3 consist, as a function of the set problem or requirement profile for the individual substrates, of different proportions of aggregates such as clay and silt (washable grains), fine, medium and coarse sand, as well as mineral stabilizers in normally occurring or crushed grains of expanded clay, expanded shale, lava, pumice, crushed tile or concrete material, limestone chips and slag in the gravel range. The addition of nutrients, rooting-aiding gels in the form of alginates, as well as pH-value-increasing and/or decreasing substances may also be done.

TABLE 1

| Fiber Group A | dtex ≤ 100 1 = approx. 1 cm | dtex ≤ 100 1 = approx. 2.5 cm | dtex ≤ 100 1 = approx. 5 cm | dtex ≤ 100 1 = approx. 7.5 cm | dtex ≤ 100 1 = approx. 10 cm |
| --- | --- | --- | --- | --- | --- |
| 1 | 0.5 | — | 0.5 | 0.5 | — |
| 2 | 1 | 0.5 | — | 0.5 | 0.5 |

TABLE 1-continued

| | | | | | |
|---|---|---|---|---|---|
| 3 | 1 | 1 | 1.5 | 1 | 1 |
| 4 | 1.5 | 1.5 | 2.0 | 2 | 2 |
| 5 | 1.5 | 2 | 2.5 | 2 | 2 |

| Fiber Group B | dtex ≦ 200 1 = approx. 1 cm | dtex ≦ 200 1 = approx. 2.5 cm | dtex ≦ 200 1 = approx. 5 cm | dtex ≦ 200 1 = approx. 7.5 cm | dtex ≦ 200 1 = approx. 10 cm |
|---|---|---|---|---|---|
| 1 | 0.25 | 0.25 | — | — | — |
| 2 | 0.5 | 1 | 2 | 1 | 0.5 |
| 3 | 1 | 1.5 | 2.5 | 1.5 | 1 |
| 4 | 1.5 | 1.5 | 2.5 | 2 | 1.5 |
| 5 | 1.5 | 2 | 2.5 | 2.5 | 2 |

| Fiber Group C | dtex ≦ 300 1 = approx. 1 cm | dtex ≦ 300 1 = approx. 2.5 cm | dtex ≦ 300 1 = approx. 5 cm | dtex ≦ 300 1 = approx. 7.5 cm | dtex ≦ 300 1 = approx. 10 cm |
|---|---|---|---|---|---|
| 1 | — | 0.5 | 0.5 | — | 0.5 |
| 2 | 1 | 0.5 | 1 | 0.5 | 1 |
| 3 | 1 | 1 | 2 | 1.5 | 1 |
| 4 | 1.5 | 1.5 | 2.0 | 1.5 | 1 |
| 5 | 1.5 | 2 | 2 | 2 | 2 |

Group A presents data for 100 g of fiber per 10,000 meters, Group B presents data for 200 g of fiber per 10,000 meters and Group C presents data for 300 g of fiber per 10,000 meters, each with different fiber lengths ranging from 1 to 10 cm and forming a mixture. All amounts are volume percents of synthetic fibers of the different dtex and different length values.

TABLE 2

Total amount of synthetic reinforcing fibers formed from a mixture of polypropylene, polyester and polyethylene per mixture A, B and C:

| | vol. % |
|---|---|
| Mixture 1 | 3.50% |
| Mixture 2 | 11.50% |
| Mixture 3 | 19.50% |
| Mixture 4 | 25.50% |
| Mixture 5 | 30.00% |

TABLE 3

Exemplified mixtures with volume percentages of the substrate mixtures according to Table 2.

| | Undecayable Reinforcing Fibers | Difficultly Decomposable Organic Fractions | Easily Decomposable Organic Fractions | Misc. Substrate Fractions |
|---|---|---|---|---|
| Mixture 1 optimum-intensive substrate, light II (previously optima$^R$ intensive substrate HS (highly stabilized) | 3.50 | 15 | 10 | 71.50 |
| Mixture 2 optimum-intensive substrate, heavy (previously optima$^R$ intensive substrate type V 50) | 11.5 | 5 | 15 | 68.5 |
| Mixture 3 optimum-extensive substrate, light | 19.50 | 10 | 10 | 60.50 |

TABLE 3-continued

Exemplified mixtures with volume percentages of the substrate mixtures according to Table 2.

| | Undecayable Reinforcing Fibers | Difficultly Decomposable Organic Fractions | Easily Decomposable Organic Fractions | Misc. Substrate Fractions |
|---|---|---|---|---|
| (previously optima$^R$ extensive substrate type E/30) Mixture 4 optimum-extensive substrate, heavy (previously optima$^R$ extensive substrate type E/40) | 25.5 | 5 | 15 | 54.5 |
| Mixture 5 optimum-single layer substrate, heavy (previously optima$^R$ extensive single layer mineral substrate type M) | 30.00 | 0.5 | 5 | 64.5 |

The invention also provides a process for vegetating a surface comprising preparing a pourable vegetation soil substrate. Recycled, used or new string, twisted rope or fiber woven fabrics comprising plastic fibers are cut into 1 to 10 cm lengths. The fibers are untwisted and/or carded into individual filaments, and homogeneously mixed with the slowly decomposable, difficultly decayable organic fibers and optional easily decomposable organic constituents and aggregates. The substrate is then shaped into the form of a substantially flat, vegetation support layer having a thickness of from about 0.5 cm to about 30 cm, and positioned on a surface such as a roof.

What is claimed is:

1. A fiber reinforced, pourable, soil substrate for supporting vegetation, comprising from about 3.50 to about 30 vol. % of substantially undecayable, loose, individual, untwisted or carded plastic fibers in the form of filaments having lengths of from about 1 cm to about 10 cm; from about 0.5 to about 25 vol. % of slowly decomposable, difficultly decayable, organic, fibers; and the balance being one or more of easily decayable organic constituents and aggregates; wherein the substrate has a thickness of from about 0.5 cm to about 30 cm.

2. The pourable soil substrate according to claim 1, wherein the plastic fibers comprise one or more plastics selected from the group consisting of polyamide, polyester and polyolefin.

3. The pourable soil substrate according to claim 1, wherein the plastic fibers comprise one or more plastics selected from the group consisting of polyethylene and polypropylene.

4. The pourable soil substrate according to claim 1 comprising plastic fibers of from about 5 to about 300 dtex.

5. The pourable soil substrate according to claim 1 wherein the slowly decomposing, difficultly decayable, organic fibers comprise one or more materials selected from the group consisting of coconut, sisal fibers, jute fibers, ricinus pieces, rice pieces and cacao shells.

6. The pourable soil substrate according to claim 1 wherein the proportion of the fibers is from about 1 to 50 volume % plastic fibers and 50 to 99% of slowly decomposable, difficultly decayable, organic, fibers.

7. The pourable soil substrate according to claim 1 wherein the easily decayable, organic constituent comprises one or more materials selected from the group consisting of peat, composed manure, and decayed plant matter.

8. The pourable soil substrate according to claim 1 comprising from about 5 to about 15 vol. % of easily decomposable organic constituents.

9. The pourable soil substrate according to claim 1 further comprising one or more aggregate components selected from the group consisting of clay, silt, sand, mineral stabilizers, crushed grains of expanded clay, expanded shale, lava, pumice, crushed tile, crushed concrete, limestone chips, rock chips, slag and gravel range.

10. The pourable soil substrate according to claim 9 wherein the aggregate components are present in an amount of from about 10 volume % to about 90 volume %.

11. The pourable vegetation soil substrate according to claim 1 wherein the plastic fibers are horizontally and vertically interlaced.

12. The pourable vegetation soil substrate according to claim 1 which is in the form of a substantially flat, vegetation support layer.

13. The pourable vegetation soil substrate according to claim 1 wherein the plastic fibers comprise recycled material.

14. The pourable vegetation soil substrate according to claim 1 which is positioned on a surface spaced from soil.

15. The pourable vegetation soil substrate according to claim 14 positioned on a roof spaced from soil.

16. A process for the production of a pourable vegetation soil substrate comprising providing string, twisted rope or fiber woven fabrics comprising plastic fibers, cutting the plastic fibers into 1 to 10 cm lengths, untwisting and/or carding the fibers to individual filaments and then homogeneously mixing from about 3.50 to about 30 vol. % of the filaments with from about 0.5 to about 25 vol. % of slowly decomposable, difficultly decayable organic fibers.

17. The process of claim 16 further comprising homogeneously mixing the filaments and fibers with from about 5 to about 15 vol. % of easily decomposable organic constituents and from about 10 volume % to about 90 volume % of aggregates.

18. A process for vegetating a surface comprising preparing a pourable vegetation soil substrate by providing string, twisted rope or fiber woven fabrics comprising plastic fibers, cutting the plastic fibers into 1 to 10 cm lengths, untwisting and/or carding the fibers to individual filaments, homogeneously mixing from about 3.50 to about 30 vol. % of the filaments with from about 0.5 to about 25 vol. % of slowly decomposable, difficultly decayable organic fibers; shaping the substrate into the form of a substantially flat, vegetation support layer having a thickness of from about 0.5 cm to about 30 cm, and positioning the layer on a surface.

19. The process of claim 18 further comprising homogeneously mixing the filaments and fibers with from about 5 to about 15 vol. % of easily decomposable organic constituents and from about 10 volume % to about 90 volume % of aggregates.

20. The process of claim 19 wherein the surface is a roof.

* * * * *